US008681469B2

(12) United States Patent
Gan

(10) Patent No.: US 8,681,469 B2
(45) Date of Patent: Mar. 25, 2014

(54) CIRCUIT PROTECTION DEVICE FOR USE IN MEDIUM AND HIGH VOLTAGE ENVIRONMENTS

(75) Inventor: Nikhil Purushottam Gan, Nagpur (IN)

(73) Assignee: General Electric Company, Schenectady, NY (US)

( * ) Notice: Subject to any disclaimer, the term of this patent is extended or adjusted under 35 U.S.C. 154(b) by 481 days.

(21) Appl. No.: 13/069,149

(22) Filed: Mar. 22, 2011

(65) Prior Publication Data

US 2012/0243140 A1 Sep. 27, 2012

(51) Int. Cl.
*H02H 1/00* (2006.01)

(52) U.S. Cl.
USPC .......................................................... 361/212

(58) Field of Classification Search
USPC .......................................................... 361/212
See application file for complete search history.

(56) References Cited

U.S. PATENT DOCUMENTS 6,288,625 B1 * 9/2001 Kaczkowski ............... 336/84 C
7,545,138 B2 * 6/2009 Wilkerson et al. ............ 324/127
2010/0020457 A1 1/2010 Kojovic et al.

FOREIGN PATENT DOCUMENTS

DE 10320293 A1 12/2004
WO 2010041139 A1 4/2010

OTHER PUBLICATIONS

Metwally, Self-Integrating Rogowski Coil for High-Impulse Current Measurement, Instrumentation and Measurement, Feb. 2010 vol. 59 Issue:2.

Hewson, et al., The Effect of Electrostatic Screening of Rogowski Coils Designed for Wide-Bandwidth Current Measurement in Power Electronic Applications, Power Electronics Specialists Conference, 2004. PESC 04. 2004 IEEE 35th Annual.

* cited by examiner

*Primary Examiner* — Stephen W Jackson
(74) *Attorney, Agent, or Firm* — General Electric Company

(57) ABSTRACT

A circuit protection device includes a circuit conductor, at least one wire coil having at least one winding sized to receive the circuit conductor therein, and a ground shield configured to shield the winding from an electrostatic field generated by a common mode voltage between the circuit conductor and the winding.

18 Claims, 4 Drawing Sheets

CIRCUIT PROTECTION DEVICE FOR USE IN MEDIUM AND HIGH VOLTAGE ENVIRONMENTS

BACKGROUND OF THE INVENTION

The embodiments described herein relate generally to circuit protection devices and, more particularly, to circuit protection devices having a circuit breaker At least some known circuit protection devices or circuit breakers include a Rogowski coil for use in measuring current through a circuit. The measured current is used to monitor equipment for a circuit fault. However, at least some known circuit protection devices operate in an environment that can cause a secondary voltage to be generated between the Rogowski coil and the circuit. The secondary voltage can cause electrostatic stress, which can cause dielectric breakdown within the Rogowski coil. In addition, the secondary voltage can cause a current to be generated within the Rogowski coil which can cause electromagnetic interference within the Rogowski coil. Accordingly, it is desirable to provide means of protecting the Rogowski coil from such a secondary voltage and current.

BRIEF DESCRIPTION OF THE INVENTION

In one aspect, a circuit protection device includes a circuit conductor, at least one wire coil including at least one winding sized to receive the circuit conductor therein, and a ground shield configured to shield the winding from an electrostatic field generated by a common mode voltage between the circuit conductor and the winding.

In another aspect, a Rogowski coil assembly is provided for use with a circuit breaker coupled to a circuit conductor. The Rogowski coil assembly includes a Rogowski coil having at least one winding sized to receive the circuit conductor therein, and a ground shield configured to shield the winding from an electrostatic field generated by a common mode voltage between the circuit conductor and the winding.

In another aspect, a method is provided for assembling a circuit protection device having a circuit conductor, at least one wire coil having at least one winding, and a ground shield. The method includes coupling the winding to the circuit conductor and coupling the ground shield to the wire coil, wherein the ground shield is configured to shield the winding from an electrostatic field generated by a common mode voltage between the circuit conductor and the winding.

DETAILED DESCRIPTION OF THE INVENTION

Exemplary embodiments of apparatus for use in medium-voltage and/or high-voltage circuit protection devices are described hereinabove. These embodiments facilitate measuring a current level through a circuit conductor to detect a circuit fault, such as a short circuit. In addition, these embodiments enable a circuit interrupter, such as a circuit breaker, to be activated in response to a circuit fault. In some embodiments, a Rogowski coil is used to measure the current through the circuit conductor to facilitate rapid response to changes in the amplitude and/or phase of the current. A ground shield is used to protect the Rogowski coil from a secondary voltage that can form between the Rogowski coil and the circuit conductor in a medium-voltage operating environment or a high-voltage operating environment. The ground shield facilitates protecting the Rogowski coil from electrostatic stress that can cause dielectric breakdown within the Rogowski coil. In addition, the ground shield protects the Rogowski coil and/or a detection circuit or other controller circuitry from current that can be produced by the secondary voltage. Furthermore, the ground shield does not substantially interfere with the electromagnetic performance of the Rogowski coil and/or the detection circuit.

Figure 1:
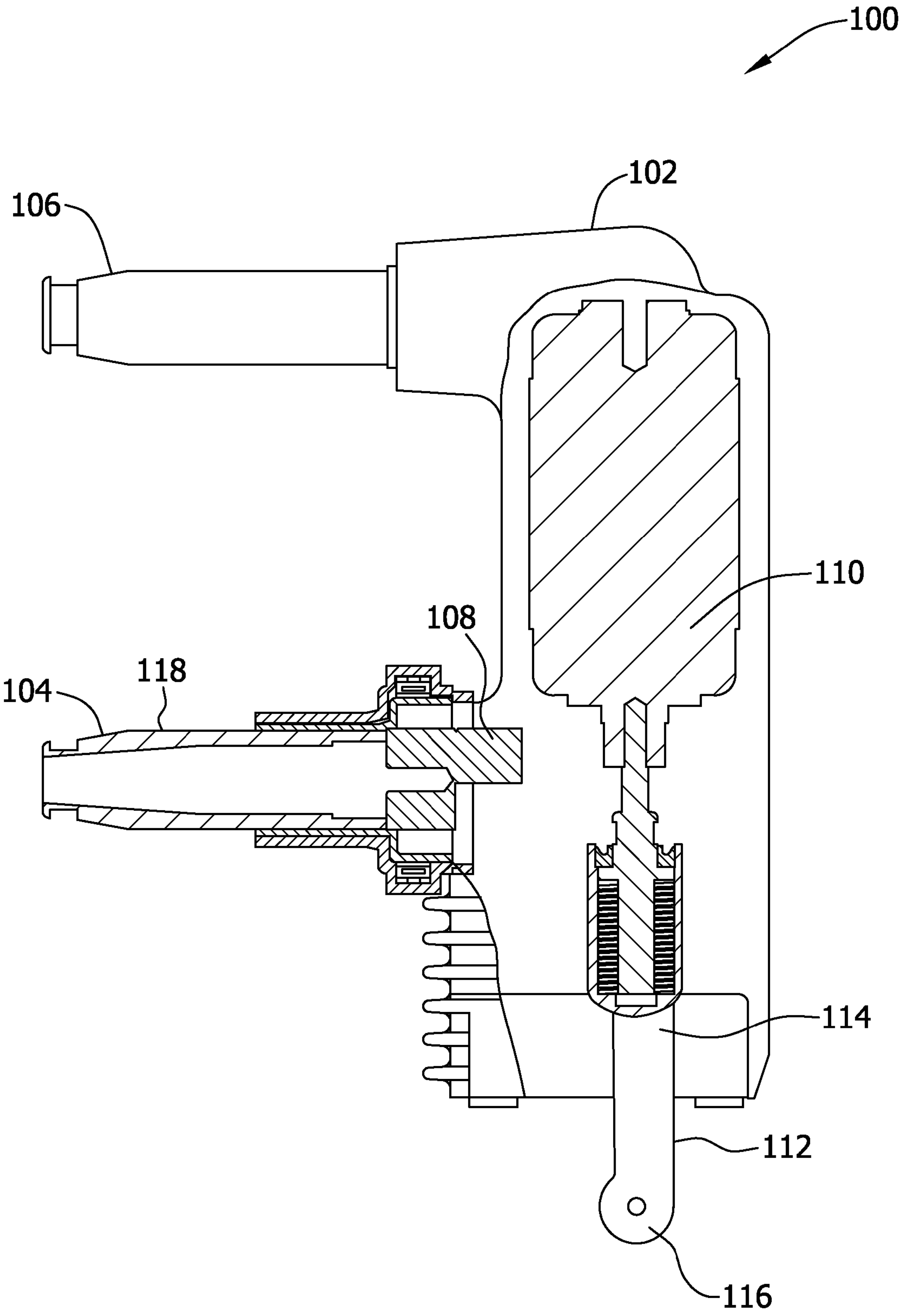
FIG. 1 is a partial side cross-sectional view of an exemplary circuit breaker.

FIG. 1 is a partial side cross-sectional view of an exemplary circuit breaker 100. In an exemplary embodiment, circuit breaker 100 is a vacuum circuit breaker. Circuit breaker 100 includes a vacuum-sealed main body 102, a first contact arm 104, and a second contact arm 106. First and second contact arms 104 and 106 are each coupled to main body 102. For example, first contact arm 104 is coupled to a first circuit conductor 108 positioned within main body 102. Similarly, second contact arm 106 is coupled to a second circuit conductor 110 positioned within main body 102. Second circuit conductor 110 is movable with respect to first circuit conductor 108 between a first position and a second position. The first position enables current flow through first and second circuit conductors 108 and 110, and through first and second contact arms 104 and 106. The second position disables or otherwise disrupts current flow through first and second circuit conductors 108 and 110, and through first and second contact arms 104 and 106. Second circuit conductor 110 is coupled to a first arm 112. For example, second circuit conductor 110 is coupled to a first end 114 of first arm 112.

Figure 2:
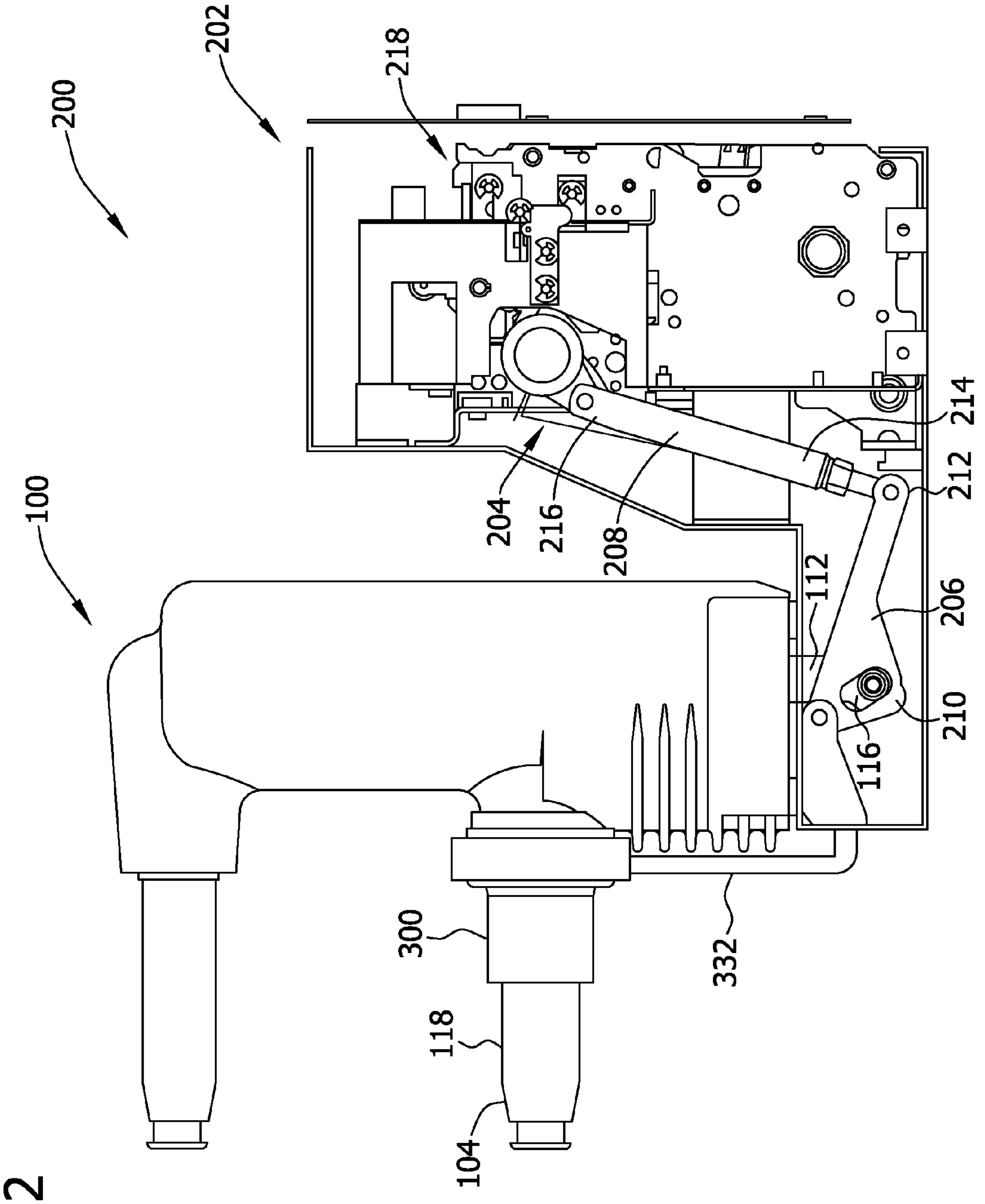
FIG. 2 is a side view of an exemplary circuit protection device that may be used with the circuit breaker shown in FIG. 1.

FIG. 2 is a side view of an exemplary circuit protection device 200. In an exemplary embodiment, circuit protection device 200 is for use with a medium-voltage circuit, such as a circuit operating at approximately 12,000 Volts. However, it should be understood that circuit protection device 200 may also be used with any suitable circuit operating in any other medium-voltage level, high-voltage level, and/or other voltage level, such as above or below approximately 12,000 Volts.

In an exemplary embodiment, circuit protection device 200 includes a circuit breaker 100 and a controller 202 coupled to circuit breaker 100. Controller 202 includes a stored energy device 204 that provides an opening force to circuit breaker 100 via one or more moveable arms, such as a second arm 206 and a third arm 208. In some embodiments, stored energy device 204 also provides a biasing force that maintains second circuit conductor 110 in the first, or closed, position to enable current flow through first and second circuit conductors 108 and 110 (both shown in FIG. 1). In one embodiment, a second end 116 of first arm 112 is coupled, such as pivotally coupled, to a first end 210 of second arm 206. A second end 212 of second arm 206 is coupled, such as pivotally coupled, to a first end 214 of third arm 208, and a second end 216 of third arm 208 is coupled, such as pivotally coupled, to stored energy device 204. In an exemplary embodiment, stored energy device 204 is coupled to circuitry, such as a detection circuit 218 for detecting a fault on a monitored circuit. When detection circuit 218 detects a fault, such as an overcurrent or any other suitable fault, detection circuit 218 transmits a signal to stored energy device 204. In response to the fault signal, stored energy device 204 imparts a force on third arm 208. The force on third arm 208 causes second arm 206 to move such that first arm 112 causes second circuit conductor 110 to separate from first circuit conductor 108, thereby preventing current flow through first and second circuit conductors 108 and 110.

In an exemplary embodiment, circuit protection device 200 includes a coil assembly 300 for use in measuring current flow through first contact arm 104 and/or first circuit conductor 108. In an exemplary embodiment, coil assembly 300 is sized such that first contact arm 104 is inserted at least partially therethrough. Additionally, coil assembly 300 includes a Rogowski coil. As is generally known in the art, a Rogowski coil includes a helical coil of wire with the lead from one end returning through the center of the coil to the other end, so that both terminals are at the same end of the coil. The coils are then wrapped around a straight conductor whose current is to be measured, such as first contact arm 104. Since the voltage that is induced in the coil is proportional to the rate of change of current in the straight conductor, the output of the Rogowski coil is usually connected to an electrical integrator circuit, such as detection circuit 218, in order to provide an output signal that is proportional to current.

One advantage of a Rogowski coil over other types of current transformers is that the wire coils can be made open-ended and flexible, allowing the wire coils to be wrapped around a live conductor without disturbing the conductor. Since a Rogowski coil has an air core rather than an iron core, it has a low inductance and can respond to fast-changing currents. Also, because a Rogowski coil has no iron core to saturate, it is highly linear even when subjected to large currents, such as those used in electric power transmission, welding, or pulsed power applications. A correctly formed Rogowski coil, with equally spaced windings, is largely immune to electromagnetic interference. However, a low-voltage Rogowski coil is generally not suitable for use above approximately 600 Volts, such as in circuit breaker 100, which, in an exemplary embodiment, operates at approximately 12,000 Volts. Such an operating voltage can cause electrostatic stress between the wire coils and the straight conductor and/or can contribute to breakdown of insulation.

Figure 3:
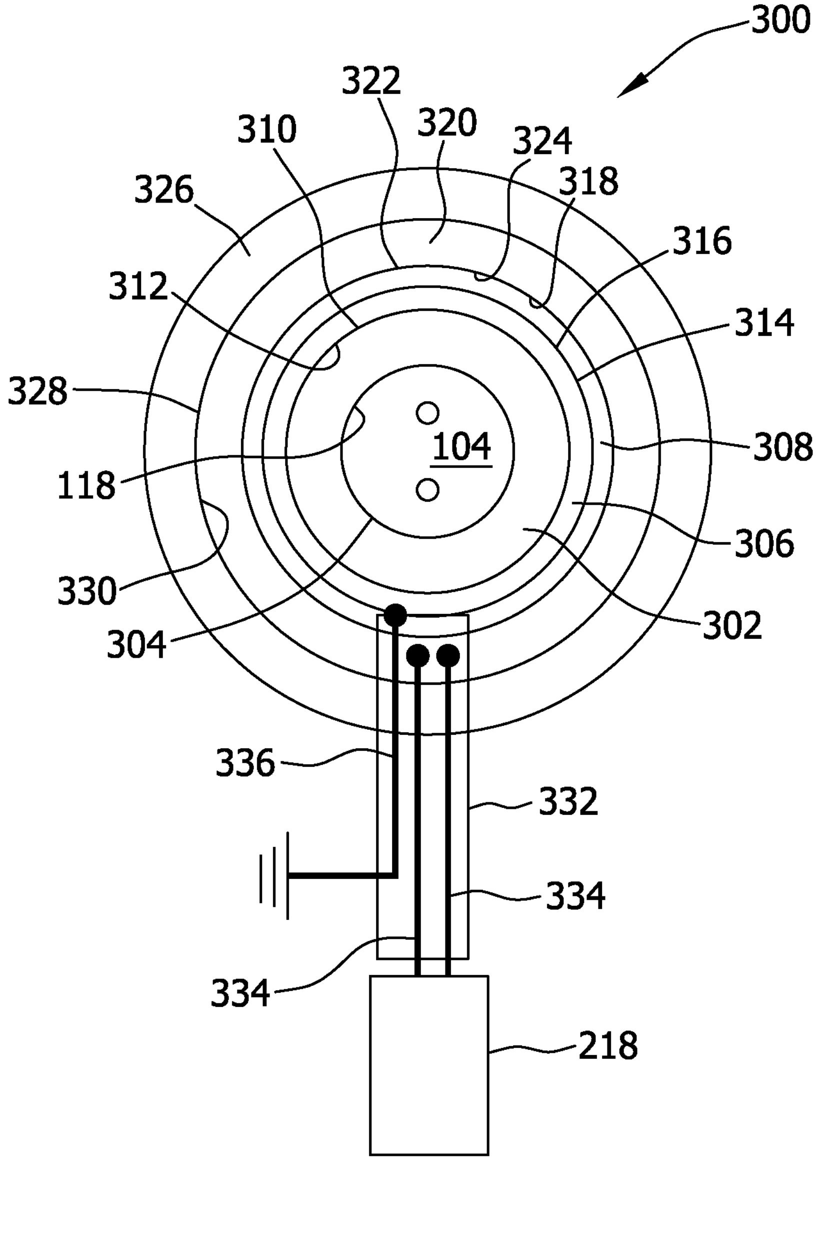
FIG. 3 is a front cross-sectional view of an exemplary coil assembly that may be used with the circuit breaker shown in FIG. 1.

FIG. 3 is a front cross-sectional view of coil assembly 300. In an exemplary embodiment, coil assembly 300 includes a first or internal cap portion 302 having an inner surface 304 positioned about an outer surface 118 of a circuit conductor, such as first contact arm 104. For example, inner surface 304 is substantially flush with outer surface 118. Coil assembly 300 also includes one or more insulation layers, such as a first or inner insulation layer 306 and a second or outer insulation layer 308. In an exemplary embodiment, first insulation layer 306 and second insulation layer 308 include a rubber material and/or a rubber-based material. Alternatively, first insulation layer 306 and/or second insulation layer 308 may include any other suitable insulative material. First insulation layer 306 includes an inner surface 310 positioned about an outer surface 312 of first cap portion 302. For example, inner surface 310 is substantially flush with outer surface 312. A ground shield 314 is positioned between first insulation layer 306 and second insulation layer 308. Specifically, ground shield 314 is positioned about an outer surface 316 of first insulation layer 306, such as substantially flush with outer surface 316. An inner surface 318 of second insulation layer 308 is positioned about ground shield 314, such as substantially flush with ground shield 314. Coil assembly 300 includes a wire coil 320, such as a Rogowski coil, having at least one winding (not shown). An inner surface 322 of wire coil 320 is positioned about an outer surface 324 of second insulation layer 308. For example, inner surface 322 is substantially flush with outer surface 324. Coil assembly 300 also includes a second or external cap portion 326 having an inner surface 328 positioned about an outer surface 330 of wire coil 320. For example, inner surface 328 is substantially flush with outer surface 330.

In an exemplary embodiment, a cable 332 extends through an opening (not shown) formed in second cap portion 326 to connect coil assembly 300 with detection circuit 218. For example, one or more signal conductors 334 transmit signals representative of a measured current level through first contact arm 104. Signal conductors 334 connect wire coil 320 and detection circuit 218. A ground conductor 336 connects ground shield 314 to a ground point.

Figure 4:
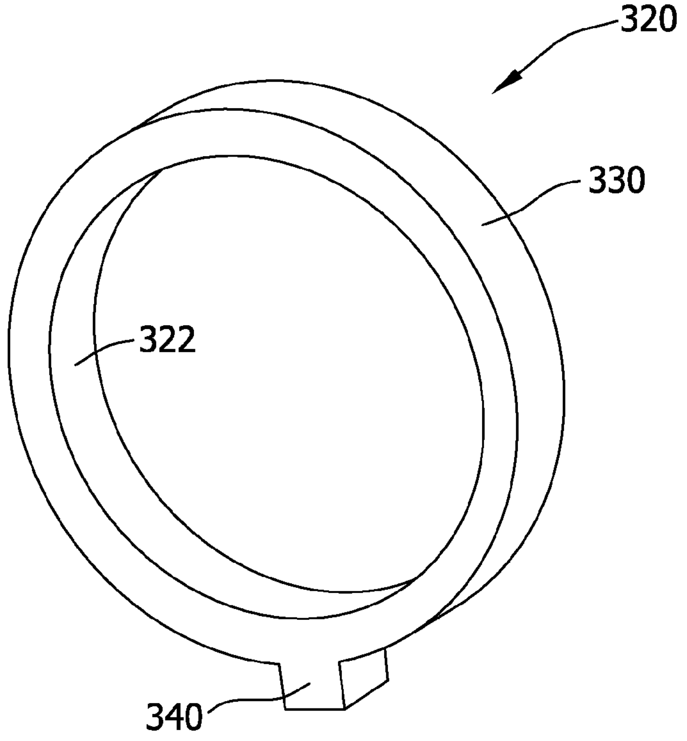
FIG. 4 is a perspective view of an exemplary wire coil that may be used with the coil assembly shown in FIG. 3.

FIG. 4 is a perspective view of wire coil 320. In an exemplary embodiment, wire coil 320 is a Rogowski coil and includes one or more windings (not shown). Wire coil 320 is used to measure a current flow through, for example, first contact arm 104 (not shown in FIG. 4) to detect a fault in a circuit or equipment connected to circuit breaker 100 and/or circuit protection device 200 (not shown in FIG. 4). In an exemplary embodiment, wire coil 320 includes a body 338 having inner surface 322 and opposite outer surface 324. In an exemplary embodiment, wire coil 320 also includes a flange 340 coupled to body 338. In one embodiment, flange 340 and body 338 are unitary. In an alternative embodiment, flange 340 and body 338 are separate components and are coupled together using, for example, an adhesive or a fastening mechanism. Flange 340 connects to cable 332 (shown in FIG. 3) to enable wire coil 320 to transmit signals representative of a measured current flow to detection circuit 218 (shown in FIG. 2). For example, flange 340 connects to signal conductors 334 (shown in FIG. 3), which are then connected to detection circuit 218.

Figure 5:
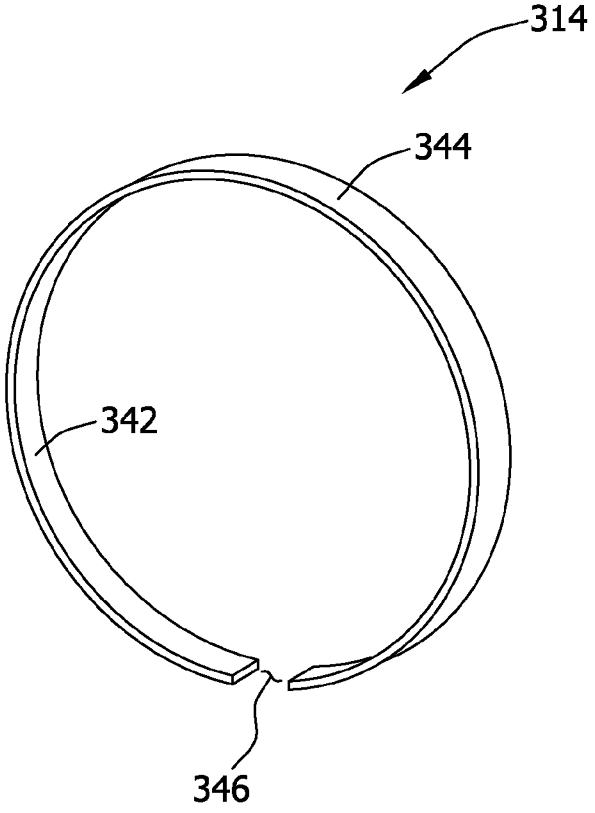
FIG. 5 is a perspective view of an exemplary ground shield that may be used with the coil assembly shown in FIG. 3 and the wire coil shown in FIG. 4.

FIG. 5 is a perspective view of ground shield 314. In an exemplary embodiment, ground shield 314 includes an inner surface 342 and an opposite outer surface 344. When coil assembly 300 (shown in FIG. 3) is assembled, inner surface 342 is positioned substantially flush with outer surface 324 of wire coil 320 (both shown in FIG. 4). Ground shield 314 connects to cable 322 (shown in FIG. 3) to enable ground shield 314 to connect to a ground point via, for example, ground conductor 336 (shown in FIG. 3). In an exemplary embodiment, ground shield 314 defines a gap 346 that is sized to fit around flange 340. Gap 346 limits the current level through ground shield 314.

Ground shield 314 shields wire coil 320 from an electrostatic field generated by a common mode voltage defined between wire coil 320 and first contact arm 104. For example, ground shield 314 protects wire coil 320 from high dielectric stress that can accumulate due to the voltage levels associated with an operating environment of a medium-voltage circuit breaker or a high-voltage circuit breaker. In known circuit breakers, such a common mode voltage generally generates a current through wire coil 320, and the current can interfere with the operation of wire coil 320. Additionally, in known circuit breakers, the current can cause damage to, for example, detection circuit 218 or other components of controller 200 (shown in FIG. 2). Accordingly, ground shield 314 causes such a current to be sent to ground via ground conductor 336. In addition, electrostatic field stress zones are diverted from wire coil 320 to ground shield 314.

In an exemplary embodiment, a method of assembling circuit protection device 100 includes assembling coil assembly 300. Initially, first cap portion 302 is coupled to first contact arm 104, such as by sliding first cap portion 302 along first contact arm 104 such that inner surface of first cap portion 304 is substantially flush with outer surface 118 of first contact arm 104. The method also includes coupling coil assembly 300 to first contact arm 104. For example, first insulation layer 306 is coupled to first cap portion 304 by, for example, sliding first insulation layer 306 along outer surface 312 of first cap portion 304 such that inner surface 310 of first insulation layer 306 is substantially flush with outer surface 312 of first cap portion 304. Ground shield 314 is coupled to first insulation layer 306 by, for example, sliding ground shield 314 along outer surface 316 of first insulation layer 306 such that inner surface 342 of ground shield 314 is substantially flush with outer surface 316 of first insulation layer 306.

Second insulation layer 308 is then coupled to ground shield 314 by, for example, sliding second insulation layer 308 along outer surface 344 of ground shield 314 such that inner surface 318 of second insulation layer 308 is substantially flush with outer surface 344 of ground shield 314. Furthermore, wire coil 320 is sized to be coupled to second insulation layer 308, such as by sliding wire coil 320 over second insulation layer 308. Inner surface 322 of wire coil 320 is substantially flush with outer surface 324 of second insulation layer 308. Second cap portion 326 is then coupled to wire coil 320 by, for example, sliding second cap portion 326 along outer surface 330 of wire coil 320. Inner surface 328 is substantially flush with outer surface 330.

Furthermore, cable 332 is coupled to coil assembly 300 and controller 200. For example, signal conductors 334 are connected to wire coil 320 and to detection circuit 218, and ground conductor 336 is connected to ground shield 314 and a ground point.

Exemplary embodiments of circuit breakers and circuit protection devices having a circuit breaker are described above in detail. The circuit breakers and circuit protection devices are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary circuit protection environment, embodiments of the invention are operational with numerous other general purpose or special purpose circuit protection environments or configurations. The circuit protection environment is not intended to suggest any limitation as to the scope of use or functionality of any aspect of the invention. In addition, the circuit protection environment should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device comprising:

a circuit conductor;

at least one wire coil configured to measure a current flow through said circuit conductor, said at least one wire coil comprising at least one winding sized to receive said circuit conductor therein; and a ground shield configured to shield said at least one winding from an electrostatic field generated by a common mode voltage between said circuit conductor and said at least one winding; and a first cap positioned between said circuit conductor and said ground shield.

2. A circuit protection device in accordance with claim 1, further comprising at least one insulation layer positioned between said ground shield and said least one wire coil.

3. A circuit protection device in accordance with claim 2, wherein said at least one insulation layer comprises a first insulation layer and a second insulation layer, said ground shield positioned between said first insulation layer and said second insulation layer.

4. A circuit protection device in accordance with claim 1, further comprising a second cap positioned along an outer surface of said least one wire coil.

5. A circuit protection device in accordance with claim 1, wherein said least one wire coil comprises a Rogowski coil.

6. A circuit protection device in accordance with claim 1, wherein said least one wire coil further comprises a main body and a flange coupled to said main body, said ground shield defines a gap sized to fit said flange to facilitate limiting the current flow through said ground shield.

7. A Rogowski coil assembly for use with a circuit breaker coupled to a circuit conductor, said Rogowski coil assembly comprising:

a Rogowski coil comprising at least one winding sized to receive the circuit conductor therein; and a ground shield configured to shield said at least one winding from an electrostatic field generated by a common mode voltage between the circuit conductor and said at least one winding; and a first cap positioned between said circuit conductor and said ground shield.

8. A Rogowski coil assembly in accordance with claim 7, further comprising at least one insulation layer positioned between said ground shield and said Rogowski coil.

9. A Rogowski coil assembly in accordance with claim 8, wherein said at least one insulation layer comprises a first insulation layer and a second insulation layer, said ground shield positioned between said first insulation layer and said second insulation layer.

10. A Rogowski coil assembly in accordance with claim 7, further comprising a second cap positioned along an outer surface of said Rogowski coil.

11. A Rogowski coil assembly in accordance with claim 10, wherein said second cap includes an opening extending therethrough, said opening sized to receive a cable configured to communicatively couple said Rogowski coil to a measurement device.

12. A Rogowski coil assembly in accordance with claim 7, wherein said Rogowski coil further comprises a main body and a flange coupled to said main body, said ground shield defines a gap sized to fit said flange to facilitate limiting the current flow through said ground shield.

13. A method of assembling a circuit protection device having a circuit conductor, at least one wire coil having at least one winding, and a ground shield, said method comprising:

coupling the at least one winding to the circuit conductor; and coupling the ground shield to the at least one wire coil, the ground shield configured to shield the at least one winding from an electrostatic field generated by a common mode voltage between the circuit conductor and the at least one winding; and positioning a first cap between the circuit conductor and the ground shield.

14. A method in accordance with claim 13, further comprising positioning at least one insulation layer between the ground shield and the at least one wire coil.

15. A method in accordance with claim 14, wherein the at least one insulation layer includes a first insulation layer and a second insulation layer, said positioning at least one insulation layer comprises positioning the ground shield between the first insulation layer and the second insulation layer.

16. A method in accordance with claim 13, further comprising:

positioning a second cap along an outer surface of the at least one wire coil.

17. A method in accordance with claim 16, further comprising:

inserting a cable through an opening extending through the second cap; and connecting a measurement device to the at least one wire coil using the cable.

18. A method in accordance with claim 13, wherein the at least one wire coil includes a main body and a flange coupled to the main body, the ground shield defines a gap sized to fit the flange, said method further comprising coupling the ground shield to the at least one wire coil such that the flange is positioned within the gap to facilitate limiting a current flow through the ground shield.

* * * * *

UNITED STATES PATENT AND TRADEMARK OFFICE

CERTIFICATE OF CORRECTION

PATENT NO. : 8,681,469 B2
APPLICATION NO. : 13/069149
DATED : March 25, 2014
INVENTOR(S) : Gan It is certified that error appears in the above-identified patent and that said Letters Patent is hereby corrected as shown below:

In the Specification:

In Column 4, Line 43, delete “cable 322” and insert -- cable 332 --, therefor.

In Column 4, Line 66, delete “circuit protection device 100” and insert -- circuit protection device 200 --, therefor.

In the Claims:

In Column 6, Line 33, in Claim 2, delete “said least” and insert -- said at least --, therefor.

In Column 6, Line 41, in Claim 4, delete “said least” and insert -- said at least --, therefor.

In Column 6, Line 43, in Claim 5, delete “said least” and insert -- said at least --, therefor.

In Column 6, Line 45, in Claim 6, delete “said least” and insert -- said at least --, therefor.

Signed and Sealed this
Eighth Day of July, 2014

Michelle K. Lee
*Deputy Director of the United States Patent and Trademark Office*